United States Patent [19]
Chiu et al.

[11] Patent Number: 5,670,977
[45] Date of Patent: Sep. 23, 1997

[54] SPATIAL LIGHT MODULATOR HAVING SINGLE BIT-LINE DUAL-LATCH MEMORY CELLS

[75] Inventors: Edison H. Chiu, Richardson; Quang Dieu An, Plano, both of Tex.

[73] Assignee: Texas Instruments Incorporated, Dallas, Tex.

[21] Appl. No.: 389,673

[22] Filed: Feb. 16, 1995

[51] Int. Cl.⁶ .................................................. G09G 3/34
[52] U.S. Cl. .................................................. 345/85; 345/205
[58] Field of Search ............................ 345/84, 85, 205, 345/206, 98, 99, 100; 365/189.02, 189.07, 189.09, 189.11

[56] References Cited

U.S. PATENT DOCUMENTS

| | | | |
|---|---|---|---|
| 4,662,746 | 5/1987 | Hornbeck | 350/269 |
| 4,954,988 | 9/1990 | Robb | 365/189.02 |
| 4,956,619 | 9/1990 | Hornbeck | 330/4.3 |
| 5,061,049 | 10/1991 | Hornbeck | 359/224 |
| 5,079,544 | 1/1992 | DeMond | 340/701 |
| 5,083,857 | 1/1992 | Hornbeck | 359/291 |
| 5,105,369 | 4/1992 | Nelson | 364/525 |
| 5,142,405 | 8/1992 | Hornbeck | 359/226 |
| 5,278,652 | 1/1994 | Urbanus et al. | 358/160 |
| 5,285,407 | 2/1994 | Gale et al. | 365/189.11 |
| 5,452,024 | 9/1995 | Sampsell | 348/755 |
| 5,526,051 | 6/1996 | Gove et al. | 348/388 |
| 5,548,301 | 8/1996 | Kornher et al. | 345/85 |
| 5,583,688 | 12/1996 | Hornbeck | 359/291 |

*Primary Examiner*—Steven Saras
*Attorney, Agent, or Firm*—Robert C. Klinger; James C. Kesterson; Richard L. Donaldson

[57] ABSTRACT

A spatial light modulator (SLM) device (30) having a pixel array (31) and an associated memory cell array (36). Each memory cell (10a) receives pixel data from a single bit-line that carries pixel data down columns of the memory cell array (36). Each memory cell (10a) has two latches (21, 25). A first latch (21) receives data from the bit-line. A second latch (25) receives data transferred from the first latch (21) in response to a transfer signal, and is in electrical communication with at least one address electrode (14) of each pixel (10) of the pixel array (31).

19 Claims, 2 Drawing Sheets

SPATIAL LIGHT MODULATOR HAVING SINGLE BIT-LINE DUAL-LATCH MEMORY CELLS

CROSS-REFERENCE TO RELATED APPLICATIONS

Cross-reference is made to the following co-pending patent applications, the teachings of which are incorporated herein by reference.

U.S. patent application Ser. No. 08/373,692 filed Jan. 17, 1995 entitled "Monolithic Programmable Format Pixel Array"

U.S. patent application Ser. No. 08/389,674, filed Feb. 16, 1995 entitled "Memory Cell Array for Digital Spatial Light Modulator".

TECHNICAL FIELD OF THE INVENTION

This invention relates to spatial light modulators, and more particularly to a spatial light modulator having a memory cell for storing data for addressing the spatial light modulator.

BACKGROUND OF THE INVENTION

Spatial light modulators (SLMs), as used for imaging applications, are arrays of pixel-generating elements that emit or reflect light to an image plane. The pixel-generating elements are often themselves referred to as "pixels", as distinguished from the pixels of the image. This terminology is clear from context so long as it is understood that more than one pixel of the SLM array can be used to generate a pixel of the image.

The pixels of the SLM are individually addressable, such that the image is defined by which pixels are on or off at a given time. Moving images can be generated by re-addressing image frames. Greyscale images can be created with various modulation schemes, and color images can be created by filtering the emitted or reflected light.

A digital micro-mirror device (DMD), sometimes referred to as a deformable micro-mirror device, is a type of SLM. It may be used to form images, and has been used in both display and printing applications. A DMD used for imaging applications such as display or printing, has an array of hundreds or thousands of tiny tilting mirrors. Light incident on the DMD is selectively reflected or not reflected from each mirror to an image plane. Each mirror is attached to one or more hinges mounted on support posts, and spaced by means of an air gap over underlying control circuitry. The control circuitry includes a memory cell associated with each mirror. Each memory cell stores a 1-bit data value, which determines the state of an applied electrostatic force applied to the mirror. This electrostatic force is what causes each mirror to selectively tilt. DMDs DMDs may be manufactured using integrated circuit techniques, with the mirror elements fabricated over a substrate that contains the memory cells. Like other integrated circuits, it is desirable to improve manufacturing output by simplifying the circuit design.

SLMs other than DMDs, as well as other types of micro-mechanical devices, might also use memory cell arrays. Regardless of the application, simplified circuit design is advantageous.

SUMMARY

One aspect of the invention is a spatial light modulator (SLM) having an array of pixels that are electrically addressable with data signals from an array of memory cells. Each memory cell is in electrical communication with at least one of the pixels via at least one address electrode. Each memory cell has a first latch that transfers pixel data to a second latch in response to a transfer signal. The second latch provides a data signal representative of the pixel data stored in that latch to the pixel. A bit-line is associated with each column of the memory cell array. Each bit-line delivers the pixel data down the bit-line to the first latch of at least one memory cell in that column. A write word-line is associated with each row of the memory cell array. Each word-line delivers a write signal for enabling a row of memory cells to be written by the data signal.

An advantage of the invention is that the memory cell array needs only one bit-line per memory cell rather than two. The simplified design improves device yield during manufacture. The use of a single bit-line reduces the circuitry required to be placed under the pixels, which permits them to be more closely spaced.

Another advantage of the invention is that the dual-latch design hastens loading of data to the SLM. When the pixel data is latched into the second latch, the first latch is freed to be loaded with new pixel data. This dual latch design is also referred to as a "shadow latch" design. The invention provides sufficiently fast data transfer rates and high fanout capability so that memory multiplexed designs can be implemented.

DETAILED DESCRIPTION OF THE INVENTION

The following description is in terms of a DMD-type spatial light modulator (SLM), which has a memory cell associated with each mirror element of an array of mirror elements. The memory cells are loaded with 1-bit data values on a row-by-row basis, via bit-lines that deliver the data down columns of the memory cell array. The data loaded to each memory cell represents an address signal for tilting an associated mirror element. The invention is directed to an improved memory cell array, which requires only one bit-line per memory cell. Also, the two-latch design of the memory cells permits data to be written into one latch of a memory cell while data in the other latch is being used to address the mirror elements.

However, the invention is not limited to use with DMDs, and applies to memory cell arrays for other applications. For example, SLMs other than DMDs might be addressed with data from a memory cell array. In the case of a DMD, each pixel of the image is generated with one or more "mirror elements". In the case of an SLM, a more general term would be "pixels", which for purposes of this description refers to the elements of the SLM that generate the pixels of the image. In other words, the SLM is assumed to have individually addressable pixels that either emit or reflect light for generating pixels of an image.

Figure 1:
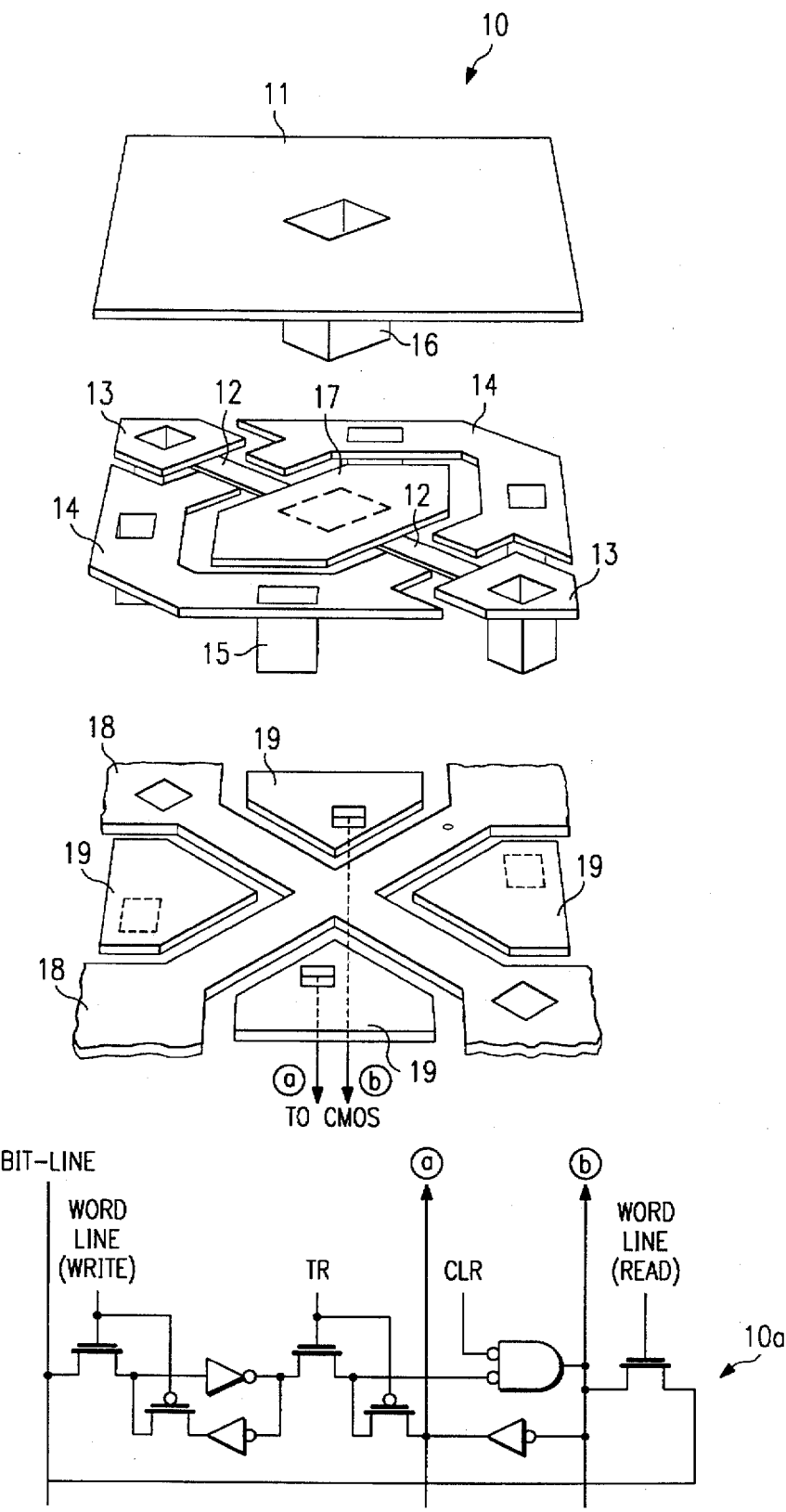
FIG. 1 is an exploded view of a hidden-hinge type mirror element used in a digital micro-mirror device (DMD), and having a memory cell in accordance with the invention.

FIG. 1 is an exploded perspective view of a single mirror element 10 of a DMD. For purposes of example, mirror element 10 is a hidden-hinge type mirror element. As with other DMD designs, the hinges 12 are supported on support posts 13. Additionally, address electrodes 14 are supported by electrode posts 15 on the same level as hinges 12 and hinge support posts 13. The mirrors 11 are fabricated above the hinge/electrode layer and are supported by mirror support posts 16.

Mirror support post 16 is fabricated over a landing yoke 17. Landing yoke 17 is attached to one end of each of the two hinges 12, which are torsion hinges. The other end of each hinge 12 is attached to a hinge support post 13. The hinge support posts 13 and electrode posts 15 support the hinges 12, address electrodes 14, and landing yoke 17 over a control bus 18 and address pads 19. When mirror 11 is tilted, the tip of the landing yoke 17 contacts the control bus 18. The control bus 18 and landing pads 19 have appropriate electrical contacts to a substrate of address circuitry, which is typically fabricated within the substrate using CMOS fabrication techniques.

The address circuit of each mirror element 10 includes a memory cell 10a, manufactured with CMOS techniques. As explained below, each memory cell 10a is loaded with 1 bit of data passed down a bit-line. Rows of memory cells 10a are enabled with word-lines, which may carry either a write enable or a read enable signal. Writing is used for loading data to memory cells 10a, whereas reading is used during testing in lieu of actual mirror operation.

In the example of this description, there is a one-to-one correspondence between memory cells 10a and mirror elements 10. Thus, memory cell 10a is connected to a single pair of address electrodes 14, via nodes a and b, for a single mirror element 10. However, in other embodiments, groups of mirror elements 10 might share a memory cell 10a. The memory cell 10a would be connected to multiple pairs of address electrodes 14, but only the mirror element 10 that is to be addressed with the stored data would be enabled. These shared memory cells are part of a "memory multiplexed" loading method described in U.S. Pat. No. 5,548,301, filed Sep. 2, 1994, entitled "Pixel Control Circuitry for Spatial Light Modulator", assigned to Texas Instruments Incorporated and incorporated by reference herein. The present invention is useful for multiplexed memory cells as well as non-multiplexed memory cells.

Another type of mirror element is the torsion beam type, whose hinges are not hidden but rather extend from opposing sides of the mirror. Still other types of DMDs are cantilever beam types and flexure beam types. The invention could, be used with a memory cell array that addresses any of these types of mirror elements. Various DMD types are described in U.S. Pat. No. 4,662,746, entitled "Spatial Light Modulator and Method"; U.S. Pat. No. 4,956,619, entitled "Spatial Light Modulator"; U.S. Pat. No. 5,061,049 entitled "Spatial Light Modulator and Method"; U.S. Pat. No. 5,083, 857 entitled "Multi-level Deformable Mirror Device"; and U.S. Pat. No. 5,583,688, entitled "Multi-Level Digital Micromirror Device". Each of these patents is assigned to Texas Instruments Incorporated and each is incorporated herein by reference.

In operation for imaging applications, a light source illuminates the surface of the DMD. A lens system may be used to shape the light to approximately the size of the array of mirror elements 10 and to direct this light toward them. The mirror support post 16 permits mirror 11 to rotate under control of a hinge 12. Mirror 11 tilts in response to an electrostatic force caused by application of an appropriate voltage to an address electrode 14.

Voltages based on data in the memory cells 10a of the underlying CMOS circuit are applied to the two address electrodes 14, which are located under opposing corners of mirror 11. Electrostatic forces between the mirrors 11 and their address electrodes 14 are produced by selective application of voltages to the address electrodes 14. The electrostatic force causes each mirror 11 to tilt either about +10 degrees (on) or about −10 degrees (off), thereby modulating the light incident on the surface of the DMD. Light reflected from the "on" mirrors 11 is directed to an image plane, via display optics. Light from the "off" mirrors 11 is reflected away from the image plane. The resulting pattern forms an image. Various modulation techniques can be used to form greyscale images, and color images can be created with filtered light.

In effect, the mirror 11 and its address electrodes 14 form capacitors. When appropriate voltages are applied to mirror 11 and its address electrodes 14, a resulting electrostatic force (attracting or repelling) causes the mirror 11 to tilt toward the attracting address electrode 14 or away from the repelling address electrode 14.

Once the electrostatic force between the address electrodes 14 and the mirror 11 is removed, the energy stored in the hinge 12 provides a restoring force to return the mirror 11 to an undeflected position. Appropriate voltages may be applied to the mirror 11 or address electrodes 14 to aid in returning the mirror 11 to its undeflected position.

Further details describing the use of DMDs for display applications may be found in U.S. Pat. No. 5,079,544, entitled "Standard Independent Digitized Video System"; in U.S. Pat. No. 5,526,051, entitled "Digital Television System"; and in U.S. Pat. No. 5,452,024, entitled "DMD Display System." Each of these patents and patent applications is assigned to Texas Instruments Incorporated, and each is incorporated herein by reference.

Figure 2:
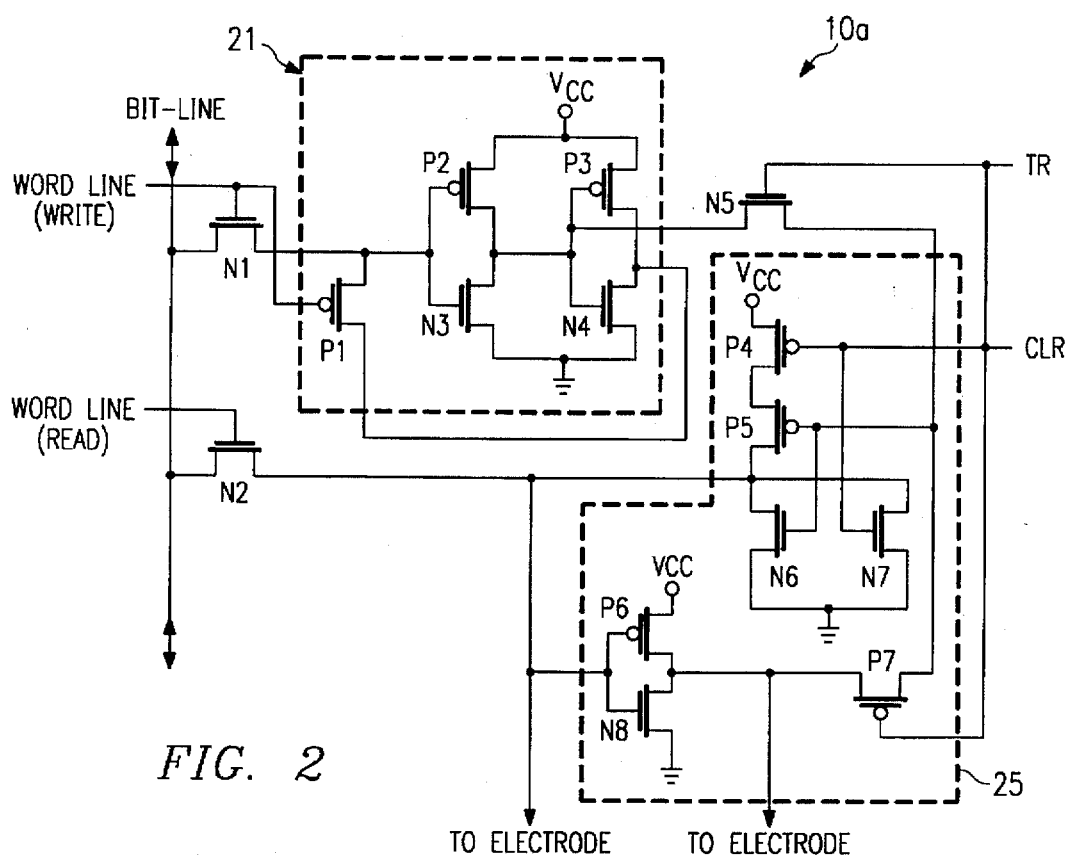
FIG. 2 is a transistor-level diagram of the memory cell of FIG. 1.

FIG. 2 is a transistor-level circuit diagram of the memory cell 10a of FIG. 1. As in FIG. 1, each memory cell 10a has only one bit-line, which is bi-directional.

Memory cell 10a is essentially comprised of two latches, a primary latch 21 and a secondary latch 25. Primary latch 21 is comprised of transistors P1, P2, P3, N3, and N4. Secondary latch 25 is comprised of transistors P4, P5, P6, P7, N6, N7, and N8. The prefixes "N" and "P" identify the respective transistors as NMOS or PMOS transistors, respectively.

For write operation, the write word line is high and the read word line is low. Pixel data on the bit-line is written into a first latch 21 via a write switch, N1. The read word line is low, so that N2 is off. When a high transfer (TR) pulse is applied, N5 is on and P7 is off. This causes the data stored in the primary latch 21 to be transferred to the secondary latch 25 via an output line connected to the node between P2 and N3. When the data transfer is complete, N5 is turned off and P7 is turned on. The true and complement outputs of the secondary latch 25 drive the address electrodes of the associated mirror element 10 when transistor P7 is on. By having transistor P7 off when transferring data between latches, the transfer speed is fast because the secondary latch 25 need not instantaneously drive the address electrodes.

For read operation, the read word-line is high and the write word-line is low. The read switch N2 is on. This causes data latched in the second latch 25 to be read out via N2 to the bit-line. The bit-line is this bi-directional.

For clear operation, the clear (CLR) line is high, which sets the data in the second latch 25 to zero. The clear function is used to clear all memory cells 10a of the display to a black state in a short time period. If there were no clear feature, the AND gate of FIG. 1 (transistors P4, P5, N6, and N7 of FIG. 2) for the CLR input would be replaced with an inverter.

Figure 3:
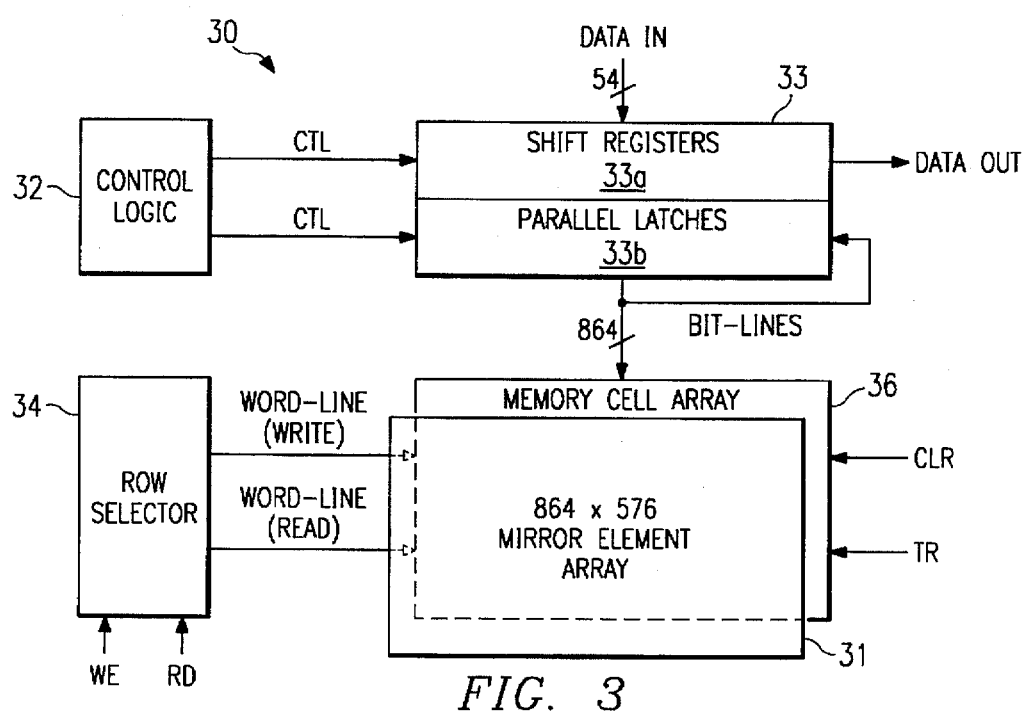
FIG. 3 is a block diagram of a DMD device having an array of mirror elements and associated memory elements in accordance with the invention and also having peripheral control circuitry.

FIG. 3 is a block diagram of a DMD device 30 having a mirror element array 31 fabricated over a memory cell array 36. The mirror element array 31 has mirror elements 10, and the memory cell array 36 has memory cells 10a, such as those of FIG. 1.

DMD device 30 also has peripheral a control circuitry, including a control logic circuit 32, a pixel data loading circuit 33, and a row selector 34. As explained above, in the example of this description, there is a one-to-one correspondence between memory cells 10a and mirror elements 10, such that each memory cell 10a of array 36 is connected to the address electrodes of a single mirror element 10, as in FIG. 1. In the example of this description, array 31 has 864 mirror elements per row (864 columns) and 576 rows of mirror elements. This is a typical array size for display applications.

Each memory cell of array 36 receives the input signals described above in connection with FIG. 2. As is also illustrated in FIG. 3, these input signals include a pixel data signal on its bit-line, a read or a write signal on the word-lines, a data transfer signal (TR), and optionally a clear signal (CLR).

Data is loaded into array 36 via data loading circuit 33 in a special "bit-plane" format. Instead of being in pixel format, where data is ordered by pixel, row, frame, the data is ordered by bit, row, bit-plane, frame. In other words, the primary order of the data is bit-by-bit, with all bits of one bit weight for all pixels being ordered together, then all bits of another bit weight, etc. For example, 8-bit pixel data would be ordered into 8 bit-planes, each bit-plane being comprised of the data for 1 bit of 8 bit weights. This permits all mirror elements 10 of DMD device 30 to be simultaneously addressed with an electrical signal corresponding to a 1-bit value loaded to their associated memory cells 10a. The length of time that any one mirror element 10 remains on is controlled in accordance with the bit weight.

The formatting of data in this manner permits a type of pulse width modulation, which permits DMD device 30 to generate greyscale images. For display applications, further details describing pulse width modulation and the formatting of data for input to DMD device 30 are set out in U.S. Pat. No. 5,278,652, entitled "DMD Architecture and Timing for Use in a Pulse Width Modulated Display System", assigned to Texas Instruments Incorporated and incorporated by reference herein.

Although all mirror elements 10a of array 31 are simultaneously addressed, the memory cells 10a of array 36 are loaded on a row-by-row basis. This is accomplished with data loading circuit 33. It is only after all memory cells 10a of array 36 are loaded that the mirror elements 10 of array 31 are addressed via their address electrodes 14. Control logic circuit 32 provides timing and control signals that synchronize the data loading circuit 33 and row selector 24 to the data being loaded.

Data loading circuit 33 is comprised of a number of shift registers 33a. During one clock period, each shift register 33a receives 1 bit of data. Thus, for n-bit shift registers 33a, the load cycle to fill shift registers 33a requires n clock periods. For example, for an 864-column array, 54 16-bit shift registers 33a each receive a 1-bit value during each clock cycle, with 16 clock cycles for loading one row of data.

After shift registers 33a receive one row of data, they pass this row data in parallel to parallel latches 33b. Parallel latches 33b hold the row data, while shift registers 33a are receiving the next row.

Parallel latches 33b provide the row data in parallel on the bit-lines to a row of memory cell array 36. More specifically, they hold the row data on the bit-lines, such that each column of memory cells 10a receives a data signal representing a bit of data. The row of memory cells of array 36 that is to receive the row data is selected with row selector 34. The row selector 34 provides a row address, which it may generate with a counter for loading consecutive rows, and includes a decoder.

Control logic circuit 32 provides timing and control signals that synchronize the data loading circuit 33 and the row selector 34. Further details of the loading circuit 33 are set out in U.S. patent Ser. No. 08/373,692, entitled "Monolithic Programmable Format Pixel Array", assigned to Texas Instruments Incorporated and Incorporated by reference herein.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A spatial light modulator, comprising:
an array of electrically addressable pixels, arranged in rows and columns;
a memory cell array, arranged in rows and columns, each memory cell being in data communication with at least one of said pixels, each said memory cell having a first latch in data communication with a second latch, said first latch transferring pixel data to said second latch in response to a transfer signal, said second latch providing an address signal representative of said pixel data to said at least one of said pixels with which said memory cell is in data communication;
a bit-line associated with each said column of said memory cell array, each said bit-line delivering said pixel data to the first latch of each said memory cell in its associated column of said memory cell array; and
a write word-line associated with each said row of said memory cell array, each said word-line delivering a write signal enabling its associated row of said memory cell array to be written with said pixel data.

2. The spatial light modulator of claim 1, wherein each said memory cell further has a write switch at an input to said first latch, said write switch being enabled by said write word-line and said write switch controlling whether said pixel data on said bit-line is delivered to said memory cell.

3. The spatial light modulator of claim 1, wherein said bit-line is bi-directional, further comprising a read word-line associated with each said row of said memory cell array, each said read word-line delivering a read signal enabling said row of said memory cell array to deliver said pixel data to said bit-lines.

4. The spatial light modulator of claim 3, wherein each said memory cell further has a read switch at an output of said memory cell, said read switch being enabled by said read signal and said read switch controlling whether said pixel data is delivered to said bit-line.

5. The spatial light modulator of claim 4, wherein said read switch is connected to an output of said second latch.

6. The spatial light modulator of claim 1, wherein each said memory cell is in electrical communication with a single one of said pixels.

7. The spatial light modulator of claim 1, wherein each said pixel has a true address electrode and a complement address electrode, and wherein each said second latch has a true output and a complement output connected to said true address electrode and said complement address electrode, respectively.

8. The spatial light modulator of claim 7, wherein each said memory cell is in electrical communication with multiple of said pixels.

9. The spatial light modulator of claim 8, wherein said pixels each comprise a deflectable mirror positioned over said address electrodes.

10. The spatial light modulator of claim 1, wherein each said second latch has a switch responsive to a clear signal for loading data directly to said second latch.

11. A digital micro-mirror device comprising: an array of mirror elements, each mirror element being electrically addressable in response to an address signal applied at an address electrode;

a memory cell array, arranged in rows and columns, for storing pixel data representing the state of said address signal, each memory cell being in data communication with at least one of said mirror elements, wherein each said memory cell has a first latch and a second latch in data communication with said first latch, said first latch transferring said pixel data to said second latch in response to a transfer signal, said second latch providing said address signal to at least one said pixel;

a single bit-line associated with each said column of said memory cell array, each said bit-line delivering pixel data to its associated column of said memory cell array; and a write word-line associated with each said row of said memory cell array, each said word-line delivering a write signal enabling its associated row of said memory cell array to be written with said pixel data.

12. The device of claim 11, wherein each said mirror element has a true address electrode and a complement address electrode, and wherein each said second latch has a true output and a complement output connected to said true address electrode and said complement address electrode, respectively.

13. The device of claim 12, wherein said mirror elements each comprise a deflectable mirror positioned over said address electrodes.

14. The device of claim 11, further comprising a data loading circuit receiving said pixel data on a row-by-row basis and delivering said pixel data to said memory cell array via said bit-lines.

15. The device of claim 14, further comprising a row selector for determining which said row of said memory cell array is to receive said row of data.

16. The device of claim 11, further comprising a read word-line associated with each said row of said memory cell array, each said read word-line delivering a read signal enabling said row of said memory cell array to deliver said pixel data to said bit-lines.

17. The device of claim 11, wherein each said memory cell is in electrical communication with a single one of said mirror elements.

18. The device of claim 11, wherein each said memory cell is in electrical communication with multiple of said mirror elements.

19. The device of claim 11, wherein each said memory cell has a first latch and a second latch in data communication with said first latch, said second latch providing said address signal, said first latch transferring said pixel data to said second latch in response to a transfer signal.

* * * * *